United States Patent
Manoochehri et al.

(10) Patent No.: US 12,430,893 B2
(45) Date of Patent: Sep. 30, 2025

(54) SYSTEM AND METHOD FOR SIMILARITY LEARNING IN DIGITAL PATHOLOGY

(71) Applicant: Leica Biosystems Imaging, Inc., Vista, CA (US)

(72) Inventors: Hafez Eslami Manoochehri, Richardson, TX (US); Chad Salinas, San Diego, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 388 days.

(21) Appl. No.: 18/082,773

(22) Filed: Dec. 16, 2022

(65) Prior Publication Data

US 2023/0215145 A1 Jul. 6, 2023

Related U.S. Application Data

(60) Provisional application No. 63/266,249, filed on Dec. 30, 2021.

(51) Int. Cl.
*G06V 10/774* (2022.01)
*G06N 3/0475* (2023.01)
*G06N 3/094* (2023.01)
*G06V 10/74* (2022.01)
*G06V 10/764* (2022.01)
*G06V 10/82* (2022.01)

(52) U.S. Cl.
CPC ......... *G06V 10/774* (2022.01); *G06N 3/0475* (2023.01); *G06N 3/094* (2023.01); *G06V 10/761* (2022.01); *G06V 10/764* (2022.01); *G06V 10/82* (2022.01)

(58) Field of Classification Search
CPC .. G06V 10/774; G06V 10/761; G06V 10/764; G06V 10/82; G06N 3/0475; G06N 3/094
USPC ........................................................ 382/156
See application file for complete search history.

(56) References Cited

U.S. PATENT DOCUMENTS 8,199,994 B2 6/2012 Amir
9,081,822 B2 7/2015 Xu et al.
(Continued)

FOREIGN PATENT DOCUMENTS

CA 3210137 A1 * 9/2022 ............. G06N 3/045
WO 2020/193708 A1 10/2020

OTHER PUBLICATIONS

Gildenblat, Jacob, and Eldad Klaiman. "Self-supervised similarity learning for digital pathology." arXiv preprint arXiv:1905.08139 (2019).
(Continued)

*Primary Examiner* — Charlotte M Baker
(74) *Attorney, Agent, or Firm* — FROST BROWN TODD LLP

(57) ABSTRACT

Systems and methods for similarity learning in digital pathology are provided. In one aspect, an apparatus for generating training image data includes a hardware memory configured to store executable instructions and a hardware processor in communication with the hardware memory, wherein the executable instructions, when executed by the processor, cause the processor to obtain a plurality of histopathology images, classify two or more of the histopathology images as similar or dissimilar, and create a dataset of training image data including the classified histopathology images.

17 Claims, 11 Drawing Sheets

(56) References Cited

U.S. PATENT DOCUMENTS

| | | |
|---|---|---|
| 2020/0019617 A1 | 1/2020 | Eswaran et al. |
| 2021/0019342 A1 | 1/2021 | Peng et al. |
| 2021/0118136 A1 | 4/2021 | Hassan-Shafique et al. |

OTHER PUBLICATIONS

Hou, Le, et al. "Unsupervised histopathology image synthesis." arXiv preprint arXiv:1712.05021 (2017).

Extended European Search Report dated May 3, 2023, for Application No. 22214200.2, 10 pages.

Caicedo, Juan C., Fabio A. González, and Eduardo Romero. "Content-based histopathology image retrieval using a kernel-based semantic annotation framework." *Journal of biomedical informatics* 44.4 (2011): 519-528.

Hegde, Narayan, et al. "Similar image search for histopathology: SMILY." *NPJ digital medicine* 2.1 (2019): 56.

Kalra, Shivam, et al. "Yottixel—an image search engine for large archives of histopathology whole slide images." *Medical Image Analysis* 65 (2020): 101757.

Komura, Daisuke, et al. "Luigi: Large-scale histopathological image retrieval system using deep texture representations." *biorxiv* (2018): 345785.

Schaer, Roger, et al. "Deep learning-based retrieval system for gigapixel histopathology cases and the open access literature." *Journal of pathology informatics* 10.1 (2019): 19.

Sridhar, Akshay, Scott Doyle, and Anant Madabhushi. "Content-based image retrieval of digitized histopathology in boosted spectrally embedded spaces." *Journal of pathology informatics* 6.1 (2015): 41.

Yang, Pengshuai, et al. "A deep metric learning approach for histopathological image retrieval." *Methods* 179 (2020): 14-25.

Yang, Pengshuai, et al. "Liver histopathological image retrieval based on deep metric learning." 2019 *IEEE International Conference on Bioinformatics and Biomedicine (BIBM)*. IEEE, 2019.

\* cited by examiner

SYSTEM AND METHOD FOR SIMILARITY LEARNING IN DIGITAL PATHOLOGY

PRIORITY

This application claims priority to U.S. Provisional Patent App. No. 63/266,249, entitled "System and Method for Similarity Learning in Digital Pathology," filed on Dec. 30, 2021, the disclosure of which is incorporated by reference herein.

BACKGROUND

Field

The described technology relates to similarity learning in digital pathology, and in particular, to generating training image data for use in similarity learning.

Description of the Related Technology

A machine learning model trained to identify similar features in two or more images can be used for a number of different applications. Typically, the training of the machine learning model to determine whether two features are similar or dissimilar involves the use of a well-annotated training dataset containing sets of similar and dissimilar images (also referred to as different images). While machine learning models trained to determine whether features a similar or dissimilar are typically used in natural image domains, these models are not easily adapted to the domain of pathology images.

SUMMARY

In one aspect, there is provided an apparatus for generating training image data, comprising: a hardware memory configured to store executable instructions; and a hardware processor in communication with the hardware memory, wherein the executable instructions, when executed by the processor, cause the processor to: obtain a plurality of histopathology images, classify two or more of the histopathology images as similar or dissimilar, and create a dataset of training image data including the classified histopathology images.

In some embodiments, the executable instructions, when executed by the processor, further cause the processor to: using a generative adversarial network (GAN) including a discriminative network and a generative network, until the discriminative network is unable to detect whether a plurality of synthetic histopathology images are synthetic: generate the synthetic histopathology images using the generative network, wherein the synthetic histopathology images comprise at least one similar region, compare the synthetic histopathology images to the histopathology images using the discriminative network, if the discriminative network is unable to distinguish the synthetic histopathology images from the histopathology images, output the synthetic histopathology images, and if the discriminative network is able to distinguish the synthetic histopathology images from the histopathology images, provide feedback to the generative network for a next iteration, wherein creating the dataset of training image data comprises including the synthetic histopathology images output from the GAN in the dataset of training image data.

In some embodiments, the executable instructions, when executed by the processor, further cause the processor to: obtain coarse annotations regarding the similarity or dissimilarity of the two or more histopathology images, wherein the classifying of the two or more of the histopathology images as similar or dissimilar is based on the received coarse annotations.

In some embodiments, the executable instructions, when executed by the processor, further cause the processor to: receive input from a pathologist identifying the two or more histopathology images as similar or dissimilar, wherein the classifying of the two or more of the histopathology images as similar or dissimilar comprises identifying the two or more images as containing similar regions or containing no similar regions.

In some embodiments, the obtaining of the plurality of histopathology images comprises receiving the plurality of histopathology images from one or more publicly available datasets, and the classifying of the two or more of the histopathology images as similar or dissimilar is based on the received histopathology images.

In some embodiments, the histopathology images received from the one or more publicly available datasets comprise whole image level annotations indicating whether the two or more of the histopathology images are similar or dissimilar.

In some embodiments, the classifying of the two or more of the histopathology images as similar or dissimilar comprises: generate, using a generative model, annotations of similar regions or dissimilar regions within the two or more histopathology images.

In some embodiments, the annotations apply to substantially an entirety of the two or more histopathology images.

In some embodiments, the annotations apply to one or more regions within each of the two or more histopathology images.

In some embodiments, the classifying of the two or more of the histopathology images as similar or dissimilar comprises: generate, using a generative model, the two or more histopathology images based on the obtained plurality of histopathology images.

In some embodiments, the executable instructions, when executed by the processor, further cause the processor to: train a feature extractor using the training image data using a deep similarity learning methodology.

In some embodiments, the deep similarity learning methodology is configured to ignore dissimilar pairs of regions in the training image data that are labeled as similar and ignore similar pairs of regions in the training image data that are labeled as dissimilar.

In some embodiments, the deep similarity learning methodology comprises an optimization function configured to ignore dissimilar pairs of regions that are labeled as similar in the training image and ignore similar pairs of regions that are labeled as dissimilar in the training image data.

In some embodiments, the executable instructions, when executed by the processor, further cause the processor to: receive a query image, implement a search engine configured to search an image database based on the query image, and generate search results including one or more output histopathology images ranked based on similarity between the one or more output histopathology images and the query image.

Another aspect is a non-transitory computer readable medium for generating training image data, the computer readable medium having program instructions for causing a hardware processor to: obtain a plurality of histopathology images; classify two or more of the histopathology images as similar or dissimilar; and create a dataset of training image data including the classified histopathology images.

In some embodiments, the instructions are further configured to cause the hardware processor to: using a generative adversarial network (GAN) including a discriminative network and a generative network, until the discriminative network is unable to detect whether a plurality of synthetic histopathology images are synthetic: generate the synthetic histopathology images using the generative network, wherein the synthetic histopathology images comprise at least one similar region, compare the synthetic histopathology images to the histopathology images using the discriminative network, if the discriminative network is unable to distinguish the synthetic histopathology images from the histopathology images, output the synthetic histopathology images, and if the discriminative network is able to distinguish the synthetic histopathology images from the histopathology images, provide feedback to the generative network for a next iteration, wherein creating the dataset of training image data comprises including the synthetic histopathology images output from the GAN in the dataset of training image data.

In some embodiments, the instructions are further configured to cause the hardware processor to: obtain coarse annotations regarding the similarity or dissimilarity of the two or more histopathology images, wherein the classifying of the two or more of the histopathology images as similar or dissimilar is based on the received coarse annotations.

Yet another aspect is a method for generating training image data, comprising: obtaining a plurality of histopathology images; classifying two or more of the histopathology images as similar or dissimilar; and creating a dataset of training image data including the classified histopathology images.

In some embodiments, the method further comprises using a generative adversarial network (GAN) including a discriminative network and a generative network, until the discriminative network is unable to detect whether a plurality of synthetic histopathology images are synthetic: generating the synthetic histopathology images using the generative network, wherein the synthetic histopathology images comprise at least one similar region, comparing the synthetic histopathology images to the histopathology images using the discriminative network, if the discriminative network is unable to distinguish the synthetic histopathology images from the histopathology images, outputting the synthetic histopathology images, and if the discriminative network is able to distinguish the synthetic histopathology images from the histopathology images, providing feedback to the generative network for a next iteration, wherein creating the dataset of training image data comprises including the synthetic histopathology images output from the GAN in the dataset of training image data.

In some embodiments, the method further comprises obtaining coarse annotations regarding the similarity or dissimilarity of the two or more histopathology images, wherein the classifying of the two or more of the histopathology images as similar or dissimilar is based on the received coarse annotations.

BRIEF DESCRIPTION OF THE DRAWINGS

The features and advantages of the devices, systems, and methods described herein will become more fully apparent from the following description and appended claims, taken in conjunction with the accompanying drawings. These drawings depict several embodiments in accordance with the disclosure and are not to be considered limiting of its scope. In the drawings, similar reference numbers or symbols typically identify similar components, unless context dictates otherwise. The drawings may not be drawn to scale.

DETAILED DESCRIPTION

The features of the systems and methods for hybrid virtual and chemical staining of tissue samples will now be described in detail with reference to certain embodiments illustrated in the figures. The illustrated embodiments described herein are provided by way of illustration and are not meant to be limiting. Other embodiments can be utilized, and other changes can be made, without departing from the spirit or scope of the subject matter presented. It will be readily understood that the aspects and features of the present disclosure described below and illustrated in the figures can be arranged, substituted, combined, and designed in a wide variety of different configurations by a person of ordinary skill in the art, all of which are made part of this disclosure.

Multispectral Imaging System Overview

Figure 1:
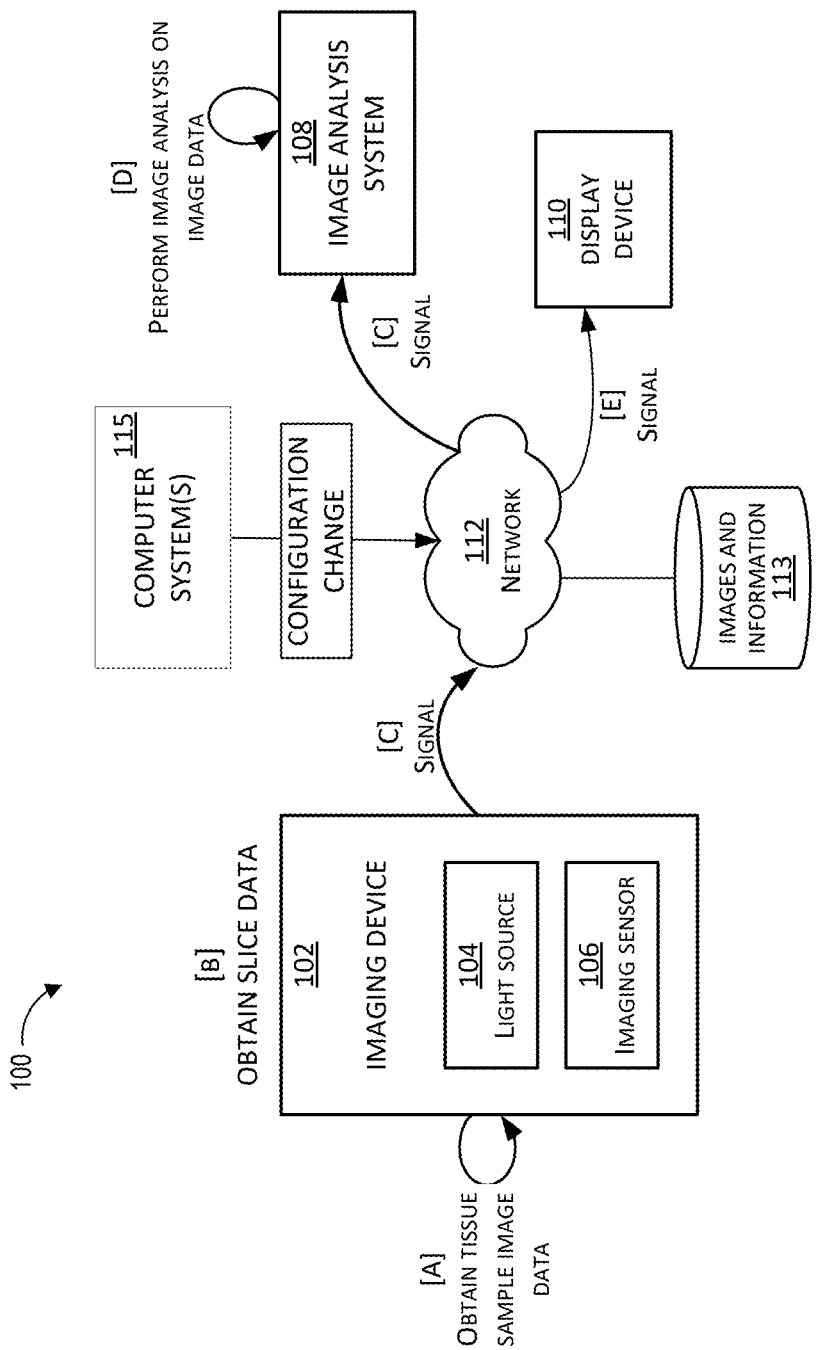
FIG. 1 illustrates an exemplary environment of a multispectral imaging system.

FIG. 1 illustrates an exemplary environment 100 (e.g., a multispectral imaging system) in which a user and/or the multispectral imaging system may analyze a sample. The environment 100 includes an automated slide stainer that is controlled to produce consistently stained slides based on one or more protocols. The environment 100 may also include an imaging device 102 that generates a digital representation (e.g., an image) of a stained slide. The digital representation may be communicated as signal [C] to a network 112 and then to an image analysis system 108 for processing (e.g., feature detection, feature measurements, etc.). The image analysis system 108 may perform image analysis on received image data. The image analysis system 108 may normalize the image data obtained using multispectral imaging for input to a machine learning algorithm and/or model, which may determine characteristics of the image. Results from the image analysis system 108 may be communicated as a signal [E] to one or more display devices 110 (which also may be referred to herein as a "display device" or a "client device").

In some implementations, the imaging device 102 includes a light source 104 configured to emit multispectral light onto the tissue sample(s) and the imaging sensor 106 configured to detect multispectral light emitted from the tissue sample. The multispectral imaging using the light source 104 may involve providing light to the tissue sample carried by a carrier within a range of frequencies. That is, the light source 104 may be configured to generate light across a spectrum of frequencies to provide multispectral imaging.

In certain embodiments, the tissue sample may reflect light received from the light source 104, which may then be detected at the imaging sensor 106. In these implementations, the light source 104 and the imaging sensor 106 may be located on substantially the same side of the tissue sample. In other implementations, the light source 104 and the imaging sensor 106 may be located on opposing sides of the tissue sample. The imaging sensor 106 may be further configured to generate image data based on the multispectral light detected at the imaging sensor 106. In certain implementations, the imaging sensor 106 may include a high-resolution sensor configured to generate a high-resolution image of the tissue sample. The high-resolution image may be generated based on excitation of the tissue sample in response to laser light emitted onto the sample at different frequencies (e.g., a frequency spectrum).

The imaging device 102 may capture and/or generate image data for analysis. The imaging device 102 may include one or more of a lens, an image sensor, a processor, or memory. The imaging device 102 may receive a user interaction. The user interaction may be a request to capture image data. Based on the user interaction, the imaging device 102 may capture image data. The imaging device may store the image data and other information in the images and information database 113. In some embodiments, the imaging device 102 may capture image data periodically (e.g., every 10, 20, or 30 minutes). In other embodiments, the imaging device 102 may determine that an item has been placed in view of the imaging device 102 (e.g., a histological sample has been placed on a table and/or platform associated with the imaging device 102) and, based on this determination, capture image data corresponding to the item. The imaging device 102 may further receive image data from additional imaging devices. For example, the imaging device 102 may be a node that routes image data from other imaging devices to the image analysis system 108. In some embodiments, the imaging device 102 may be located within the image analysis system 108. For example, the imaging device 102 may be a component of the image analysis system 108. Further, the image analysis system 108 may perform an imaging function. In other embodiments, the imaging device 102 and the image analysis system 108 may be connected (e.g., wirelessly or wired connection). For example, the imaging device 102 and the image analysis system 108 may communicate over a network 112. Further, the imaging device 102 and the image analysis system 108 may communicate over a wired connection. In one embodiment, the image analysis system 108 may include a docking station that enables the imaging device 102 to dock with the image analysis system 108. An electrical contact of the image analysis system 108 may connect with an electrical contact of the imaging device 102. The image analysis system 108 may be configured to determine when the imaging device 102 has been connected with the image analysis system 108 based at least in part on the electrical contacts of the image analysis system 108. In some embodiments, the image analysis system 108 may use one or more other sensors (e.g., a proximity sensor) to determine that an imaging device 102 has been connected to the image analysis system 108. In some embodiments, the image analysis system 108 may be connected to (via a wired or a wireless connection) a plurality of imaging devices.

The image analysis system 108 may include various components for providing the features described herein. In some embodiments, the image analysis system 108 may perform image analysis on the image data received from the imaging device 102. The image analysis system 108 may perform one or more imaging algorithms using the image data.

The image analysis system 108 may be connected to one or more display device 110. The image analysis system 108 may be connected (via a wireless or wired connection) to the display device 110 to provide a recommendation for a set of image data. The image analysis system 108 may transmit the recommendation to the display device 110 via the network 112. In some embodiments, the image analysis system 108 and the user computing device 110 may be configured for connection such that the user computing device 110 may engage and disengage with image analysis system 108 in order to receive the recommendation. For example, the display device 110 may engage with the image analysis system 108 upon determining that the image analysis system 108 has generated a recommendation for the display device 110. Further, the display devices 110 may connect to the image analysis system 108 based on the image analysis system 108 performing image analysis on image data that corresponds to the particular user computing device 110. For example, a user may be associated with a plurality of histological samples. Upon determining, that a particular histological sample is associated with a particular user and a corresponding display device 110, the image analysis system 108 may transmit a recommendation for the histological sample to the particular display device 110. In some embodiments, the display device 110 may dock with the image analysis system 108 in order to receive the recommendation.

In some implementations, the imaging device 102, the image analysis system 108, and/or the display device 110 may be in wireless communication. For example, the imaging device 102, the image analysis system 108, and/or the display device 110 may communicate over a network 112. The network 112 may include any viable communication technology, such as wired and/or wireless modalities and/or technologies. The network may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. The network 112 may include, and/or may or may not have access to and/or from, the internet. The imaging device 102 and the image analysis system 108 may communicate image data. For example, the imaging device 102 may communicate image data associated with a histological sample to the image analysis system 108 via the network 112 for analysis. The image analysis system 108 and the display device 110 may communicate a recommendation corresponding to the image data. For example, the image analysis system 108 may communicate a diagnosis regarding whether the image data is indicative of a disease present in the tissue sample. In some embodiments, the imaging device 102 and the image analysis system 108 may communicate via a first network and the image analysis system 108 and the display device 110 may communicate via a second network. In other embodiments, the imaging device 102, the image analysis system 108, and the display device 110 may communicate over the same network.

One or more third-party computer systems 115 ("computer system 115") may communicate with the imaging device 102, the image analysis system 108, and/or the display device 110. In some embodiments, the computer system 115 may communicate directly with the imaging device 102, the image analysis system 108, and/or the display device 110 directly or via the network 112.

The computer system 115 may provide information to change functionality on the imaging device 102, the image analysis system 108, and/or the display device 110, or even the network 112. For example, the information may be new software, a software update, new or revised lookup tables, or data or any other type of information that is used in any way to generate, manipulate, transfer or render an image (all being referred to herein as an "update" for ease of reference). The update may be related to, for example, image compression, image transfer, image storage, image display, image rendering, etc. The computer system 115 may provide a message to the device or system to be updated, or may provide a message to a user who interacts with the system control updating the system. In some embodiments, the computer system 115 provides an update automatically, e.g., periodically or as needed/available. In some embodiments, the computer system 115 may provide an update in response to receiving an indication from a user provide the update (e.g., affirmation for the update or a request for the update). Once an update has been made the system may perform quality check to determine if the update change the way images are displayed (e.g., color of tissue samples). If the update has changed the way images are displayed such that the change is greater than the quality threshold, the system may generate a message to alert the user to update as degraded or changed the image display quality.

With reference to an illustrative embodiment, at [A], the imaging device 102 may obtain block data. In order to obtain the block data, the imaging device 102 may image (e.g., scan, capture, record, etc.) a tissue block. The tissue block may be a histological sample. For example, the tissue block may be a block of biological tissue that has been removed and prepared for analysis. As will be discussed in further below, in order to prepare the tissue block for analysis, various histological techniques may be performed on the tissue block. The imaging device 102 may capture an image of the tissue block and store corresponding block data in the imaging device 102. The imaging device 102 may obtain the block data based on a user interaction. For example, a user may provide an input through a user interface (e.g., a graphical user interface ("GUI")) and request that the imaging device 102 image the tissue block. Further, the user may interact with imaging device 102 to cause the imaging device 102 to image the tissue block. For example, the user may toggle a switch of the imaging device 102, push a button of the imaging device 102, provide a voice command to the imaging device 102, or otherwise interact with the imaging device 102 to cause the imaging device 102 to image the tissue block. In some embodiments, the imaging device 102 may image the tissue block based on detecting, by the imaging device 102, that a tissue block has been placed in a viewport of the imaging device 102. For example, the imaging device 102 may determine that a tissue block has been placed on a viewport of the imaging device 102 and, based on this determination, image the tissue block.

At [B], the imaging device 102 may obtain slice data. In some embodiments, the imaging device 102 may obtain the slice data and the block data. In other embodiments, a first imaging device may obtain the slice and a second imaging device may obtain the block data. In order to obtain the slice data, the imaging device 102 may image (e.g., scan, capture, record, etc.) a slice of the tissue block. The slice of the tissue block may be a slice of the histological sample. For example, the tissue block may be sliced (e.g., sectioned) in order to generate one or more slices of the tissue block. In some embodiments, a portion of the tissue block may be sliced to generate a slice of the tissue block such that a first portion of the tissue block corresponds to the tissue block imaged to obtain the block data and a second portion of the tissue block corresponds to the slice of the tissue block imaged to obtain the slice data. As will be discussed in further detail below, various histological techniques may be performed on the tissue block in order to generate the slice of the tissue block. The imaging device 102 may capture an image of the slice and store corresponding slice data in the imaging device 102. The imaging device 102 may obtain the slice data based on a user interaction. For example, a user may provide an input through a user interface and request that the imaging device 102 image the slice. Further, the user may interact with imaging device 102 to cause the imaging device 102 to image the slice. In some embodiments, the imaging device 102 may image the tissue block based on detecting, by the imaging device 102, that the tissue block has been sliced or that a slice has been placed in a viewport of the imaging device 102.

At [C], the imaging device 102 may transmit a signal to the image analysis system 108 representing the captured image data (e.g., the block data and the slice data). The imaging device 102 may send the captured image data as an electronic signal to the image analysis system 108 via the network 112. The signal may include and/or correspond to a pixel representation of the block data and/or the slice data. It will be understood that the signal may include and/or correspond to more, less, or different image data. For example, the signal may correspond to multiple slices of a tissue block and may represent a first slice data and a second slice data. Further, the signal may enable the image analysis system 108 to reconstruct the block data and/or the slice data. In some embodiments, the imaging device 102 may transmit a first signal corresponding to the block data and a second signal corresponding to the slice data. In other embodiments, a first imaging device may transmit a signal corresponding to the block data and a second imaging device may transmit a signal corresponding to the slice data.

At [D], the image analysis system 108 may perform image analysis on the block data and the slice data provided by the imaging device 102. The image analysis system 108 may perform one or more image processing functions. For example, the image analysis system 108 may perform an imaging algorithm. The image analysis system 108 may also use a machine learning model, such as a convolutional neural network, for performing the image processing functions. Based on performing the image processing functions, the image analysis system 108 can determine a likelihood that the block data and the slice data correspond to the same tissue block. For example, image processing functions may perform an edge analysis of the block data and the slice data and based on the edge analysis, determine whether the block data and the slice data correspond to the same tissue block. The image analysis system 108 may obtain a confidence threshold from the display device 110, the imaging device 102, or any other device. In some embodiments, the image analysis system 108 may determine the confidence threshold based on a response by the display device 110 to a particular recommendation. Further, the confidence threshold may be specific to a user, a group of users, a type of tissue block, a location of the tissue block, or any other factor. The image analysis system 108 may compare the determined confidence threshold with the performed image analysis. Based on this comparison, the image analysis system 108 may generate a recommendation indicating a recommended action for the display device 110 based on the likelihood that the block data and the slice data correspond to the same tissue block. In other embodiments, the image analysis system 108 may provide a diagnosis regarding whether the image data is indicative of a disease present in the tissue sample, for example, based on the results of a machine learning algorithm.

At [E], the image analysis system 108 may transmit a signal to the display device 110. The image analysis system 108 may send the signal as an electrical signal to the display device 110 via the network 112. The signal may include and/or correspond to a representation of the diagnosis. Based on receiving the signal, the display device 110 may determine the diagnosis. In some embodiments, the image analysis system 108 may transmit a series of recommendations corresponding to a group of tissues blocks and/or a group of slices. The image analysis system 108 may include, in the recommendation, a recommended action of a user. For example, the recommendation may include a recommendation for the user to review the tissue block and the slice. Further, the recommendation may include a recommendation that the user does not need to review the tissue block and the slice.

Computing System Implementation Details

Figure 2:
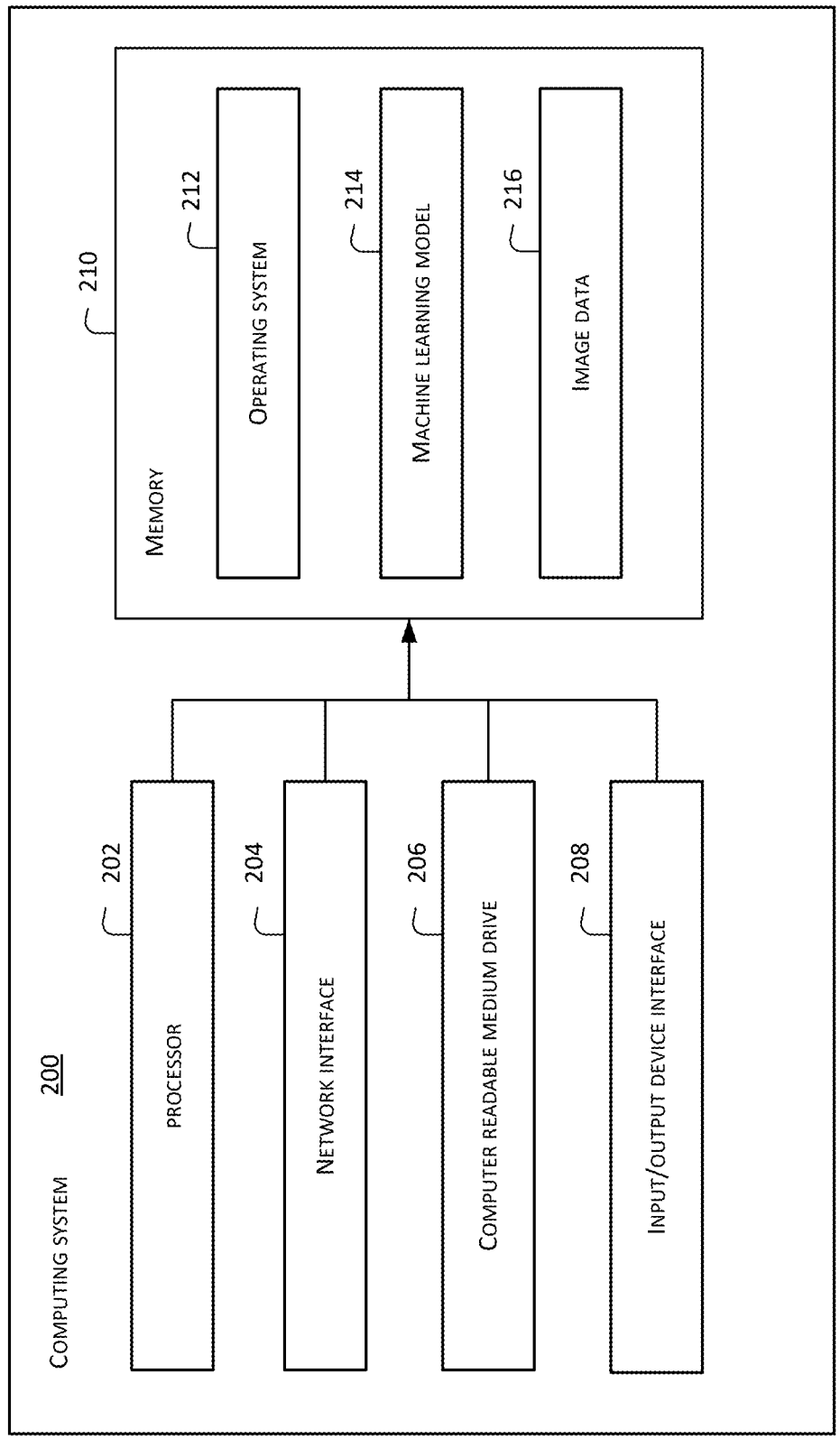
FIG. 2 is an exemplary computing system that may implement any one or more of the imaging devices, image analysis system, user computing device(s), interface server, machine learning server, and other components described herein.

FIG. 2 is an example computing system 200 which, in various embodiments, may implement the functionality of one or more of the devices described herein, such as the imaging device 102, the image analysis system 108, and the display device 110 of the multispectral imaging system illustrated in FIG. 1. In various embodiments, the computing system 200 may implement the functionality of the interface server 304 and/or the machine learning server 316. In general, the computing system of FIG. 2 may represent an apparatus for performing the methods disclosed herein. Referring to FIG. 2, the computing system 200 may include one or more hardware processors 202, such as physical central processing units ("CPUs"), one or more network interfaces 204, such as a network interface cards ("NICs"), and one or more computer readable medium 206. The computer readable medium may be, for example, high-density disks ("HDDs"), solid state drives ("SDDs"), flash drives, and/or other persistent non-transitory computer-readable media. The computing system 200 may also include an input/output device interface 208, such as an input/output ("IO") interface in communication with one or more microphones, and one or more non-transitory computer readable memory (or "medium") 210, such as random-access memory ("RAM") and/or other volatile non-transitory computer-readable media.

The network interface 204 may provide connectivity to one or more networks or computing systems. The hardware processor 202 may receive information and instructions from other computing systems or services via the network interface 204. The network interface 204 may also store data directly to the computer-readable memory 210. The hardware processor 202 may communicate to and from the computer-readable memory 210. The hardware processor 202 may execute instructions and process data in the computer readable memory 210.

The computer readable memory 210 may include computer program instructions that the hardware processor 202 executes in order to implement one or more embodiments described herein. The computer readable memory 210 may store an operating system 212 that provides computer program instructions for use by the computer processor 202 in the general administration and operation of the computing system 200. The computer readable memory 210 may further include program instructions and other information for implementing aspects of the present disclosure. In one example, the computer readable memory 210 includes instructions for training the machine learning model 214. As another example, the computer-readable memory 210 may include image data 216. In another example, the computer-readable memory 210 includes instructions to classify one or more images based on the trained machine learning model 214.

Machine Learning System Overview

Figure 3:
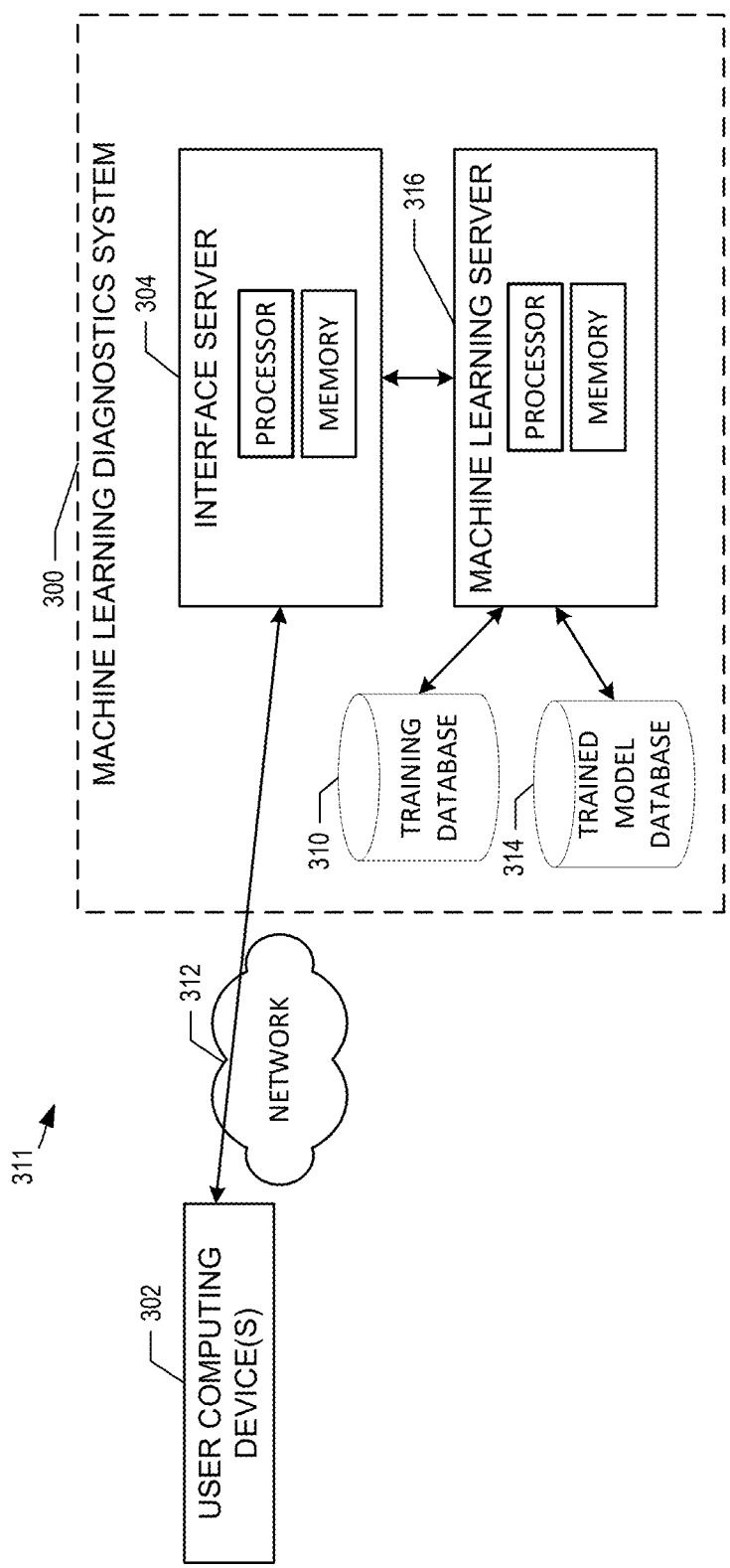
FIG. 3 illustrates an exemplary training and/or inference platform of a machine learning system.

FIG. 3 illustrates an exemplary environment 311 in which the machine learning diagnostics system 300 may train and/or use machine learning models. The environment 311 may include one or more user computing devices 302 ("user computing device 302") and the network 312. The machine learning diagnostics system 300 may include an interface server 304, a machine learning server 316, a training database 310, and a trained model database 314. Each of the interface server 304 and the machine learning server 316 may include at least a processor and a memory. Each of the interface server 304 and the machine learning server 316 may include additional hardware components, such as the hardware component(s) describe above with respect to FIG. 2.

In various embodiments, the exemplary environment 311 may be used to train one or more machine learning models. For example, the user computing device 302 may transmit (via the network 312) image data, which can include annotated image data, to the interface server 304 for training purposes. The interface server 304 may communicate with the machine learning server 316, such as by transmitting the image data. The machine learning server 316 may store the image data and other training data, such as class label masks, in the training database 310. The machine learning server 316 may train one or more machine learning models using the image data, which can include the annotated image data. Exemplary annotated image data may include labelled image data that are based on an annotated image(s) from a pathologist. The trained machine learning models may be configured to classify input image data. In other words, the trained machine learning models may be configured to output a predicted classification for new input data, such as by predicting whether a patch in the image corresponds to a class, such as, whether abnormal cells are present or not, and if there are abnormal cells, a type of cancer cells. The machine learning server 316 may store the machine learning model(s) in the trained model database 314.

In various embodiments, the exemplary environment 311 may be used to apply one or more trained machine learning models. For example, the user computing device 302 may transmit, via the network 312, image data to the interface server 304 for classification purposes. The interface server 304 may communicate with the machine learning server 316, such as by transmitting the image data to be classified. The machine learning server 316 may retrieve a trained machine learning model from the trained model database

314. The machine learning server 316 apply one or more machine learning models to the input image data to receive a predicted classification. The interface server 304 can receive the predicted classification and may transmit, via the network 312, the predicted classification to the user computing device 302. In various embodiments, the interface server 304 can present a user interface, which includes the predicted classification, to the user computing device 302.

Similarity Training For Histopathology Images

A machine learning model trained to identify similar features in two or more images can be used for a number of different applications. For example, one application for such a trained machine learning model is to retrieve similar images from a database of images based on a query image.

Similarity learning is a category in machine learning with the goal of training machine learning models for identifying similar features in images. This task may be referred to as metric learning or contrastive learning. Typically, the training of the machine learning model to determine whether two features are similar or dissimilar involves the use of a well-annotated training dataset containing sets of similar and dissimilar images (also referred to as different images). In this context, "well-annotated images" may include images in which regions of the images have been manually annotated by a pathologist to identify similar regions between two or more images.

In other domains such as natural images, acquiring dataset (s) for similarity training is relatively simple. For example, manually annotating images which contain everyday objects is a task that may be easily performed by a non-specialists. However, in the histopathology domain, acquiring annotations for similar and dissimilar regions is much more difficult than in the natural image domain. For example, it is a very time consuming and laborious task for a highly-trained pathologist to annotate images and there may be a significant human bias involved in the annotating process. Thus, there are limitations to simply applying to the histopathology domain training systems and methods which have been used for similarity learning in the natural image domain.

Figure 4A:
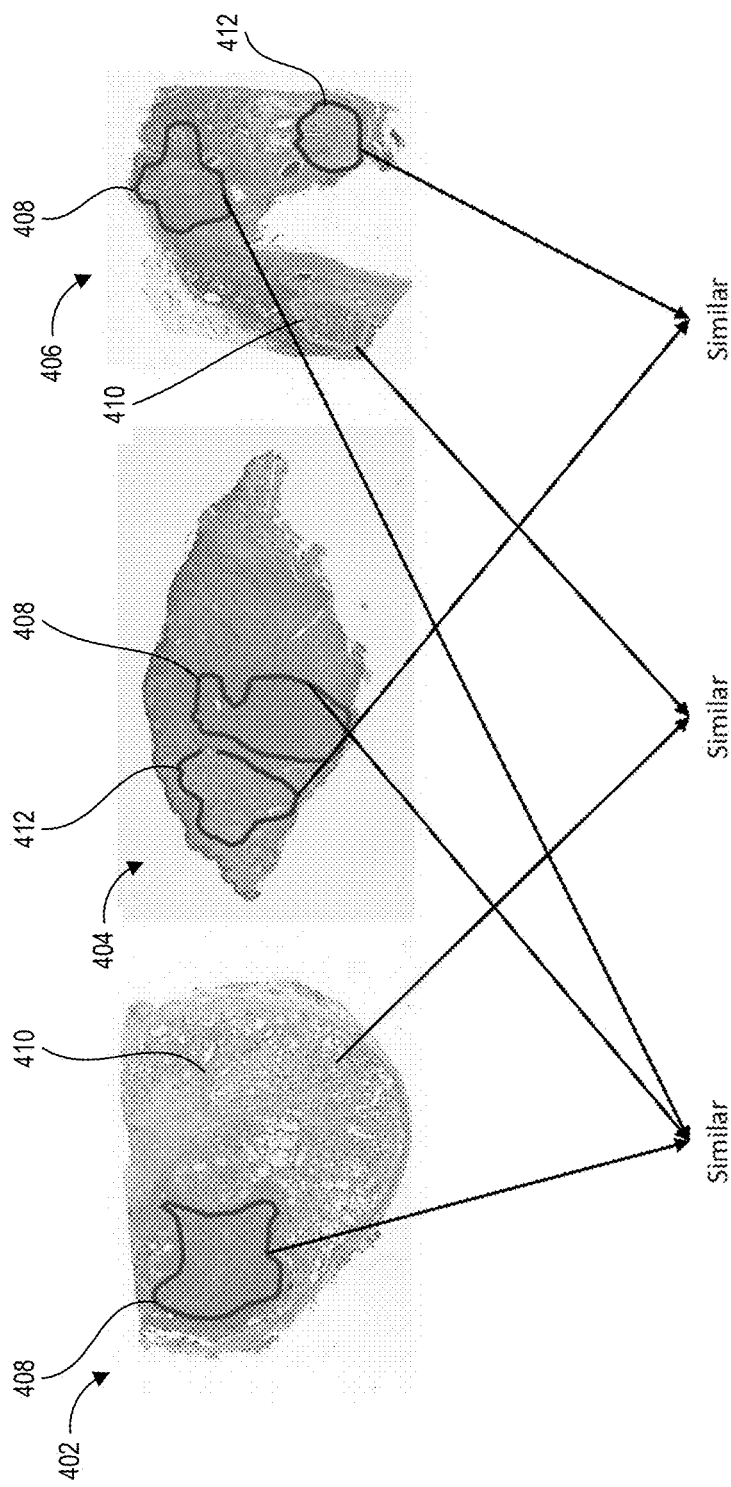
FIG. 4A illustrates a first plurality of exemplary images of a scanned tissue sample having regions.
Figure 4B:
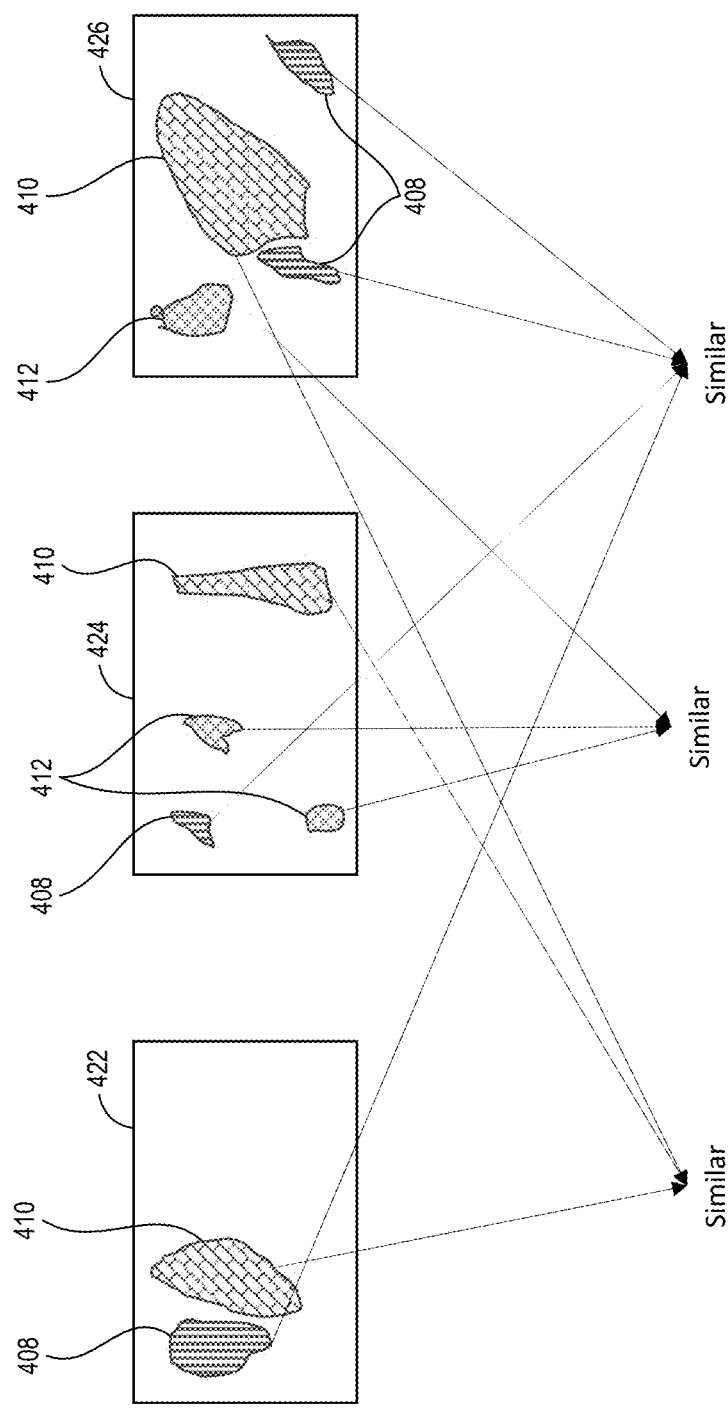
FIG. 4B illustrates a second plurality of exemplary images of a scanned tissue sample having regions that are similar to each other.

FIG. 4A illustrates a first plurality of exemplary images 402, 404, and 406 of a scanned tissue sample having regions that are similar to each other. FIG. 4B illustrates a second plurality of exemplary images 422, 424, and 426 of a scanned tissue sample having regions that are similar to each other. In particular, as described above a technician can take a plurality of slices of a tissue sample and place each slice onto a corresponding slide (e.g., see steps [A] and [B] described in connection with FIG. 1). The slides are digitally scanned to produce the images 402-406 of the tissue sample. A pathologist can identify as similar particular regions 408, 410, and 412 of the tissue sample images 402-406 and the tissue sample images 422-426.

Generating a dataset that can be used to learn similarity features in histopathology may be significantly more difficult than other tasks such as classification in histopathology. One reason it is difficult to generate the dataset is generating the dataset may involve the pathologists finding similar regions across images (e.g., images 402-406), which can be a difficult task because the similar regions may not be located in the same regions across the set of images 402-406. In other words, similar regions may be located at any position within the set of images 402-406. Because the images 402-406 can be very large, it can be challenging for pathologists to identify similar regions across the images 402-406. In contrast to classification tasks where the phenotype of the outputs (classes) is known for at least most of the cases (e.g., for natural images), there typically are no textbook definitions for similar regions in the histopathology domain. For example, tumors typically have a high level of heterogeneity and include many similar and different regions. In addition, underlying mutations in the tissue can cause regions of biopsies to be the same or different, making the identification of similar regions difficult. On the one hand, this may seem to call for human involvement in such classification. However, human biases may potentially result in the creation of an inaccurate training dataset.

One technique for training a machine learning model trained to identify similar features involved training the machine learning model on natural images and using the trained machine learning model for searching a database of histopathology images. However, these techniques are limited because the machine learning model may not be trained on the type of images (e.g., histopathology images) for which the machine learning model is intended to be used to retrieve. In other words, a machine learning model trained on natural images may not generalize well enough to histopathology images for many applications. Thus, by training the machine learning model using a database of histopathology images, aspects of this disclosure are able to more accurately identify similar and dissimilar images.

Accordingly, aspects of this disclosure relate to a system and method for generating training data that can be used to train a machine learning model to identify similar and dissimilar regions within histopathology images. For example, since the manual annotation of images by a pathologist is time consuming and may introduce biases into the annotations, aspects of this disclosure relate to techniques for automating the generation of annotation training image data for use in similarity training in the field of histopathology.

As is described in detail herein, the automatic generation of annotations for training image data may result in rough and/or noisy data compared to manually annotated images. In other words, there may be errors introduced when generating training image data using automated procedures. Thus, another aspect of this disclosure relates to the use of a similarity training algorithm that is robust to such noisy training image data in order to tolerate the noise in the training image data.

Figure 5:
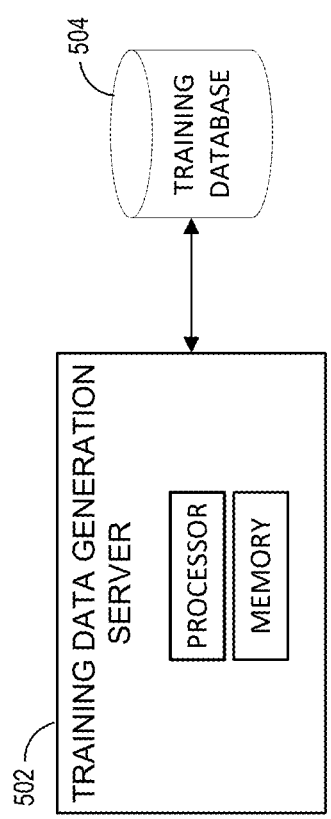
FIG. 5 is an exemplary block diagram illustrating a system configured to generate training data for a machine learning model.

FIG. 5 is an exemplary block diagram illustrating a system configured to generate training data for a machine learning model. With reference to FIG. 5, the system includes a training data generation server 502 and a training database 504. The training data generation server 502 may include a processor and a memory. The memory may be configured to store instruction that, when executed by the processor, cause the processor to generate training data to be stored in the training database 504 as described herein.

Figure 6A:
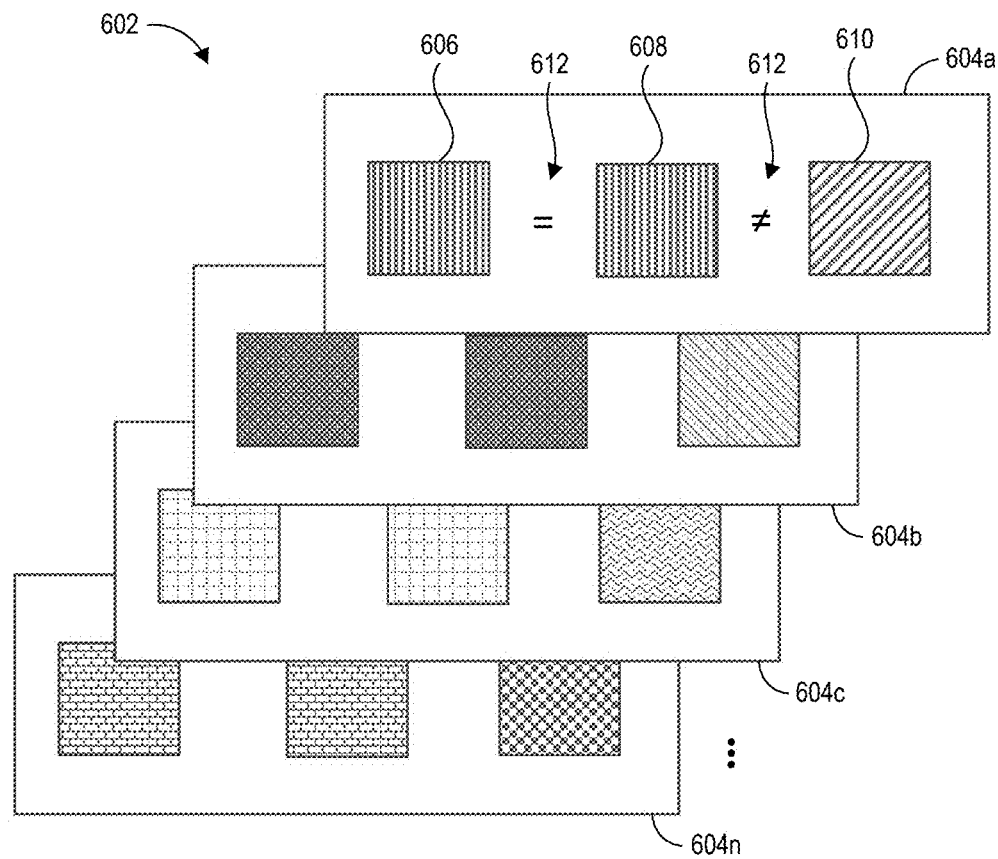
FIG. 6A illustrates exemplary training image data that may be generated using the system of FIG. 5.

FIG. 6A illustrates exemplary training image data 602 that may be generated using the system of FIG. 5. In the embodiment of FIG. 6A, the training image data 602 includes a plurality of image triplets 604*a*, 604*b*, 604*c*, . . . , 604*n*. With reference to the first triplet 604*a* as an example, the first image triplet 604*a* may include a first image 606, a second image 608, and a third image 610. The first image triplet 604 may also include metadata 612 which defines certain relationships between the first, second, and third images 606-610. For example, the metadata 612 may indicate that the first and second images 606 and 608 are similar, while the third image 610 is not similar (e.g., is different) to the first and second images 606 and 608.

In some embodiments, the first, second, and third images 602-608 may include only a region of a full image (e.g., patches extracted from images 402-406 of FIG. 4) scanned from one or more tissue sample slides. For example, the first to third images 602-608 may include a portion of regions identified as similar/different between two or three histopathology images. In other embodiments, the first, second, and third images 602-608 may include a full or multi-region image (e.g., images 402-406 of FIG. 4) scanned from one or more tissue sample slides. The metadata 612 may identify one or more regions within the first, second, and third images 602-608 as similar or different. Depending on the implementation, the first, second, and third images 602-608 may have substantially similar sizes or may have different sizes.

Although not illustrated, the training image data 602 includes a plurality of sets of images that include two images, four images, or a greater number of images. When a set of images include two images, the metadata may indicate that the two images are similar or different. In another implementation, the metadata may indicate that regions within the two images are similar or different. For sets of images having four or more images, the metadata may indicate which of the images and/or regions of the images are similar and/or different.

Figure 6B:
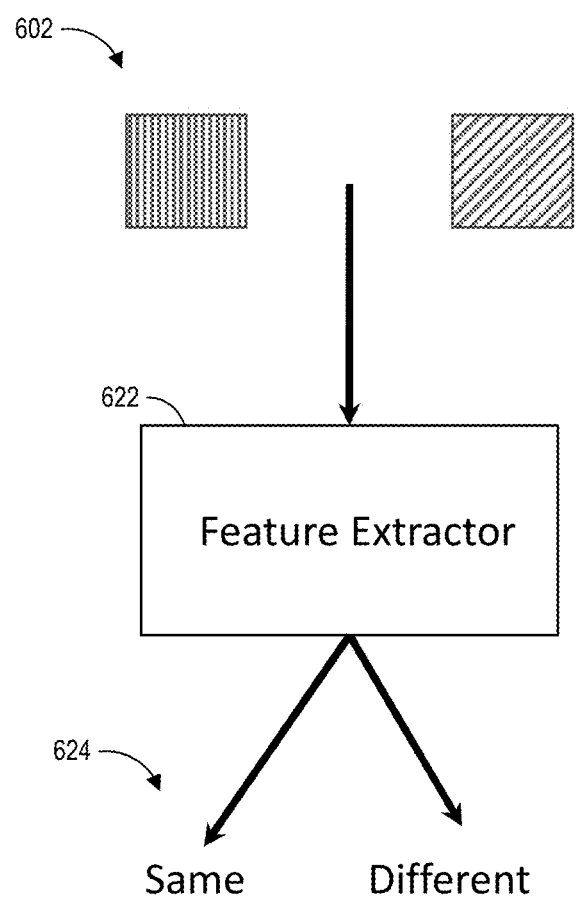
FIG. 6B is an exemplary block diagram illustrating training an exemplary machine learning model.

FIG. 6B is an exemplary block diagram illustrating training an exemplary machine learning model. With reference to FIG. 6B, the training data 602 may be used for training a feature extractor 622 (also referred to as a discrimination model) to identify whether images are similar or different. Thus, the feature extractor 622 may be trained to provide an output 624 that identifies whether a pair of images are similar of different. The trained feature extractor 622 may form a portion of a machine learning model as described herein. As discussed herein, the generation of training image data in the domain of pathological images may be complex compared to the natural image domain because pathology images are typically significantly larger than natural images, making it difficult to identify similar regions within the pathological images.

Figure 7A:
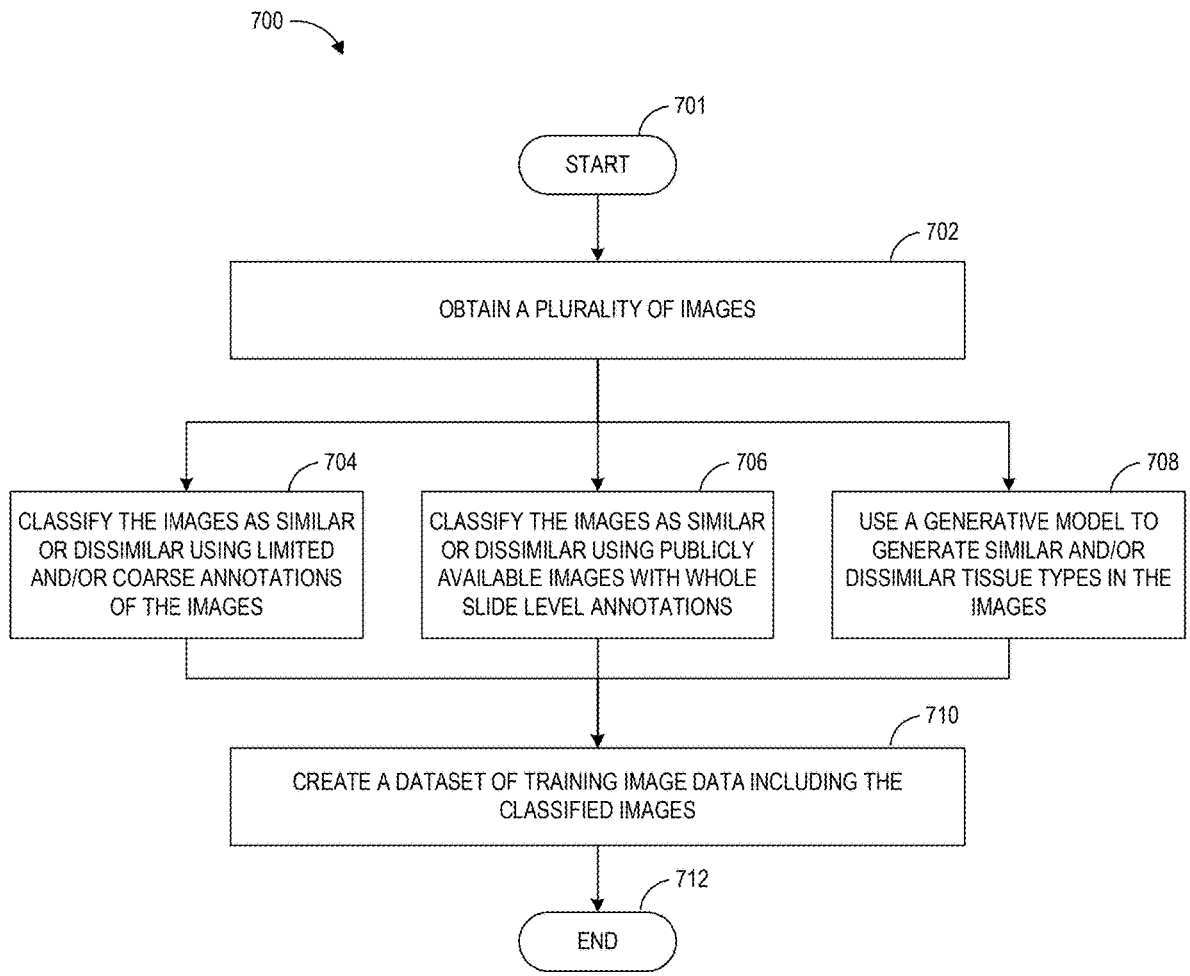
FIG. 7A is an exemplary flowchart for generating training image data.
Figure 7B:
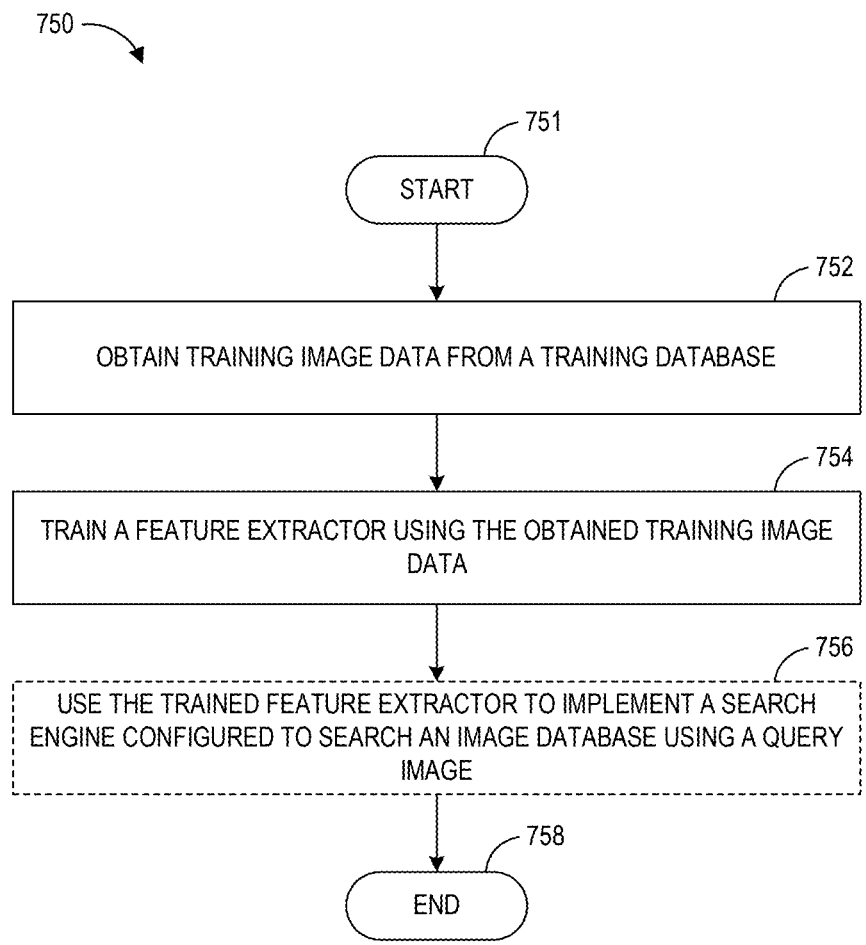
FIG. 7B is an exemplary flowchart for training a machine learning model using training image data.

FIGS. 7A and 7B illustrate exemplary flowcharts for generating training image data and using the trained image data in a machine learning model. In particular, FIG. 7A is an exemplary flowchart for generating training image data and FIG. 7B is an exemplary flowchart for training a machine learning model using training image data.

With reference to FIG. 7A, one or more blocks of the method 700 may be implemented, for example, by the processor the training data generation server 502 of FIG. 5. The method 700 begins at block 701. At block 702, the processor is configured to obtain a plurality of images. In some embodiments, the processor may receive the images from: one or more public and/or private database(s) of histopathology images, an imaging system 100 as illustrated in FIG. 1, or any other source of histopathology images. The received images may be whole slide images taken from a tissue biopsy as discussed herein.

After block 702, the processor may perform any one or more of blocks 704, 706, and 708 in order to generate annotated images to be included in a training database (such as the training database 504 of FIG. 5). At block 704, the processor is configured to classify at least some of the received images as similar or dissimilar using limited and/or coarse annotations of the images. In some implementations, the processor may receive input from a pathologist identifying one or more regions in each of a pair of images that are similar (e.g., regions 408, 410, and 412 as shown in FIG. 4). In other implementations, the processor may receive input from a pathologist at a coarser annotation level, for example, identifying two or more images as containing similar regions and/or identifying two or more images as not containing similar regions. Obtaining coarse annotations may be faster and noisier than generating images with annotations such as those shown in FIG. 4A.

At block 706, the processor is configured to classify at least some of the received images as similar or dissimilar using publicly available images with whole image level annotations from one or more publicly available datasets. Depending on the source of the data, the publicly available datasets may include images having annotations at the level as shown in FIG. 4, or may have coarse data such as annotations that apply to an entire image (e.g., identified two or images as containing similar regions and/or identifying two or more images as containing no similar regions). The processor may be configured to receive images from a plurality of different sources, and thus, the images may include annotations at different levels of detail.

At block 708, the processor is configured to use a generative model to generate similar and/or dissimilar tissue types in at least some of the received images. In some implementations, the processor may be configured to generate new images with tissue types that are similar or dissimilar based on the images obtained in block 702. For example, the processor may be configured to implement a generative adversarial network (GAN) designed to generate synthetic histopathology images. In certain implementations, the GAN is configured to generate synthetic similar histopathology images, which can then be used for training the feature extractor. In certain implementations, the GAN includes two deep networks configured to compete with each other. One of the deep networks can be implemented as a discriminative network and the other deep network can be implemented as a generative network.

The discriminative network can be configured to receive real histopathology images and synthetic (e.g., fake) histopathology images from the generative network and detect whether the images received from the generative network are synthetic. The generative network is configured to fool the discriminative network by generating synthetic histopathology images which the discriminative network is unable to distinguish from the real histopathology images. In some implementations, the generative network is configured to iteratively generate the similar synthetic histopathology images using the generative network and detect whether the generated synthetic histopathology images are synthetic by comparing the generated synthetic histopathology images to real histopathology images.

In some embodiments, the GAN is configured to iteratively generate synthetic histopathology images until the discriminative network is unable to detect whether a plurality of synthetic histopathology images are synthetic. The generative network can generate synthetic histopathology images in which the synthetic histopathology images comprise at least one similar region. The discriminative network can compare the synthetic histopathology images to the histopathology images, and if the discriminative network is unable to distinguish the synthetic histopathology images from the histopathology images, output the synthetic histopathology images, and if the discriminative network is able to distinguish the synthetic histopathology images from the histopathology images, provide feedback to the generative network for a next iteration.

Similar to blocks 702 and 704, the processor may be configured to generate annotations that apply to the entirety of two or more images (e.g., that the images contain similar regions or contain no similar regions) or may be configured to create annotations for particular regions within the newly generated images. Examples of generative models that can be used to generate these types of images and generate annotations for the created images include: conditional GAN, infoGAN, cycleGAN, pix-2-pix GAN, etc.

At block 710, the processor is configured to create a dataset of training image data including the images classified in one or more of blocks 704, 706, and 708. For example, the processor may create a new training database 504 and/or add the classified/annotated images to an existing training database 504. The method 700 ends at block 712.

The images classified in each of blocks 704-708 of method 700 may be rough or noisy compared to a curated dataset in which a pathologist reviews and annotates every region within a set of histopathology images. Thus, it is desirable to use an algorithm to train the feature extractor that is robust to such a noisy or coarse dataset. By using such a robust training algorithm, the dataset(s) generated using method 700 can be used to train a feature extractor without requiring the intensive process of manually annotating histopathology images by a pathologist.

Accordingly, aspects of this disclosure relate to a method 750 as illustrated in FIG. 7B which can be used to train a feature extractor using the training image data generated by the method 700. For example, the method 750 may be robust to mislabeled image data in order to ignore dissimilar pairs of regions that have improperly been labeled as similar and vice versa.

With reference to FIG. 7B, one or more blocks of the method 750 may be implemented, for example, by the processor of the machine learning server 316 of FIG. 3. The method 750 begins at block 751. At block 752, the processor is configured to obtain training image data from a training database such as the training database 504 of FIG. 5.

At block 754, the processor is configured to train a feature extractor using the obtained training image data. The processor may be configured to employ a robust deep similarity leaning methodology to tolerate inaccurate or noisy training image data, such as training image data generated according to method 700. In order to tolerate such noise in the training image data, the similarity learning methodology may include an optimization function configured to ignore dissimilar pairs of regions that are labeled as similar in the training image and ignore similar pairs of regions that are labeled as dissimilar in the training image data. Example algorithms that can be used to train the feature extractor using noisy training image data in block 754 include: an optimization function, one or more convolutional neural networks (CNN), a metric learning model, a deep metric learning model, a similarity learning model, a contrastive learning model, etc. In some implementations, the feature extractor may be configured to identify features which are close together as similar (e.g., closer than a threshold value) and features which are far apart as dissimilar (e.g., further apart than the threshold value). The feature extractor can use one of more different distance metrics (e.g., Euclidean distance or cosine distance) in determining the distance between two features. The training of the feature extractor may be supervised or non-supervised depending on the implementation.

At optional block 756, the processor is configured to use the trained feature extractor to implement a search engine to search an image database using a query image. For example, the processor may be configured to implement the search engine illustrated in FIG. 8. In other implementations, the processor may be configured to use the trained feature extractor for other applications, including, for example: diagnosing cancer within a histopathology image by finding similar regions in a database of images that have previously been diagnosed, retrieving metadata associated with similar images for diagnostic purposed, researching genetic similarity using similar images as a proxy, guided biopsy mechanism, etc. The method 750 ends at block 758.

Figure 8:
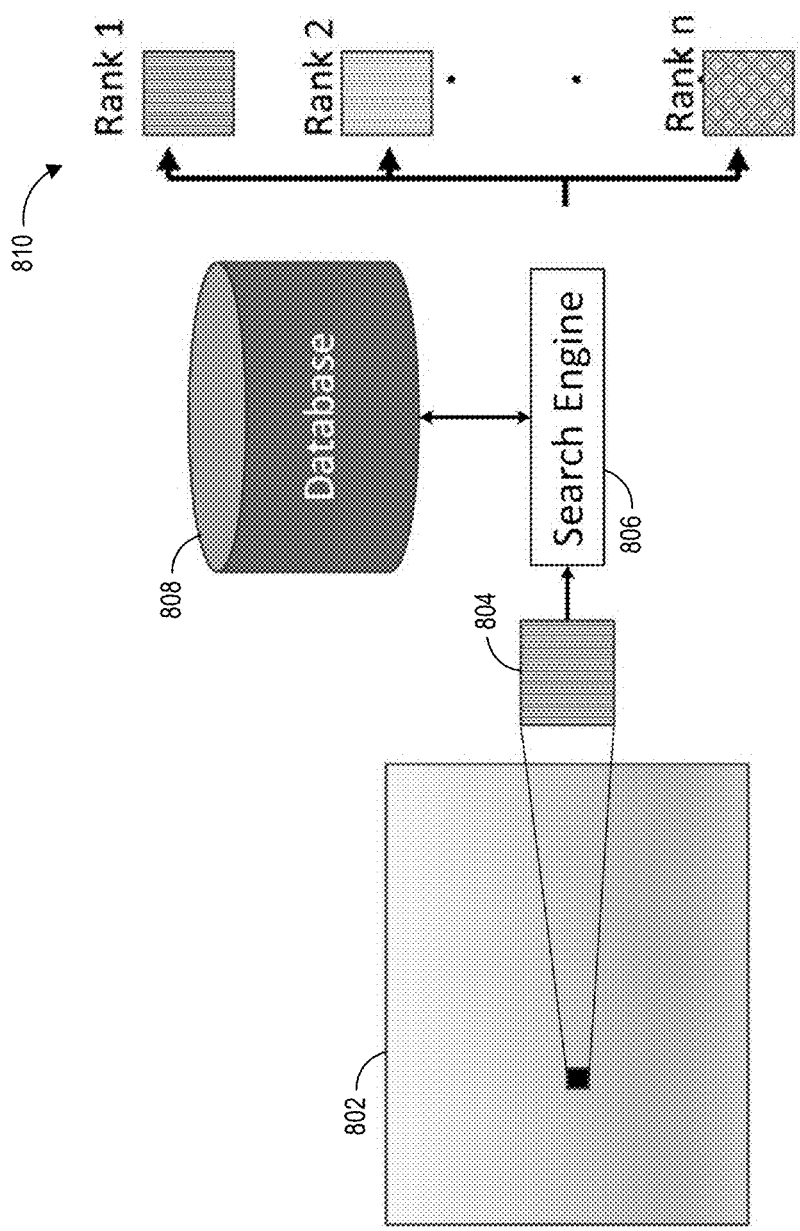
FIG. 8 is an exemplary block diagram illustrating a search engine that uses a trained machine learning model to identify images from a database.

FIG. 8 is an exemplary block diagram illustrating a search engine that uses a trained machine learning model to identify images from a database. With reference to FIG. 8, a processor may select a portion of a histopathology image 802 as a query image 804. In some embodiments, the processor may automatically select the portion of the histopathology image 802 at the query image 804, for example, by identifying a region of interest in the histopathology image 802. In another embodiments, the processor may receive the selection of the portion of the histopathology image 802 as the query image 804 based on an input received from a user. In still other embodiments, the processor may use the entire histopathology image 802 as the query image 804.

The processor may also implement a search engine 806 which receives the query image 804 to find similar images from a database 808 of histopathology images. The search engine 806 is configured to generate search results 810 including one or more histopathology images ranked based on the similarity between the one or more histopathology images and the query image 804.

The search engine 806 may include a feature extractor (e.g., the feature extractor 622 of FIG. 6B) trained using training image data generated in accordance with aspects of this disclosure. For example, the search engine 806 may use the feature extractor to identify similar and/or dissimilar regions between the query image 804 and the images stored in the database 808. The search engine 806 may then output the search results 810, for example, to be displayed for viewing by a user.

CONCLUSION

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (e.g., top, bottom, side, up, down, inward, outward, etc.) are generally used with reference to the orientation shown in the figures and are not intended to be limiting. For example, the top surface described above can refer to a bottom surface or a side surface. Thus, features described on the top surface may be included on a bottom surface, a side surface, or any other surface.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods and materials of the present invention(s). This invention(s) is susceptible to modifications in the methods and materials, as well as alterations in the fabrication methods and equipment. Such modifications will become apparent to those skilled in the art from a consideration of this disclosure or practice of the invention(s) disclosed herein. Consequently, it is not intended that this invention(s) be limited to the specific embodiments disclosed herein, but that it cover all modifications and alternatives coming within the true scope and spirit of the invention(s) as embodied in the attached claims.

What is claimed is:

1. An apparatus for generating training image data, comprising:
    a hardware memory configured to store executable instructions; and
    a hardware processor in communication with the hardware memory, wherein the executable instructions, when executed by the processor, cause the processor to:
        obtain a plurality of histopathology images,
        classify two or more of the histopathology images as similar or dissimilar, and
        create a dataset of training image data including the classified histopathology images and their classification;
    wherein the executable instructions, when executed by the processor, further cause the processor to:
        using a generative adversarial network (GAN) including a discriminative network and a generative network, until the discriminative network is unable to detect whether a plurality of synthetic histopathology images are synthetic:
        generate the synthetic histopathology images using the generative network, wherein the synthetic histopathology images comprise at least one similar region,
        compare the synthetic histopathology images to the histopathology images using the discriminative network,
        if the discriminative network is unable to distinguish the synthetic histopathology images from the histopathology images, output the synthetic histopathology images, and
        if the discriminative network is able to distinguish the synthetic histopathology images from the histopathology images, provide feedback to the generative network for a next iteration,
        wherein creating the dataset of training image data comprises including the synthetic histopathology images output from the GAN in the dataset of training image data.

2. The apparatus of claim 1, wherein the classifying of the two or more of the histopathology images as similar or dissimilar comprises:
    generate, using a generative model, the two or more histopathology images based on the obtained plurality of histopathology images.

3. The apparatus of claim 1, wherein the executable instructions, when executed by the processor, further cause the processor to:
    obtain coarse annotations regarding the similarity or dissimilarity of the two or more histopathology images,
    wherein the classifying of the two or more of the histopathology images as similar or dissimilar is based on the obtained coarse annotations.

4. The apparatus of claim 3, wherein the executable instructions, when executed by the processor, further cause the processor to:
    receive input identifying the two or more histopathology images as similar or dissimilar,
    wherein the classifying of the two or more of the histopathology images as similar or dissimilar comprises identifying the two or more images as containing similar regions or containing no similar regions.

5. The apparatus of claim 1, wherein:
    the obtaining of the plurality of histopathology images comprises receiving the plurality of histopathology images from one or more publicly available datasets, and
    the classifying of the two or more of the histopathology images as similar or dissimilar is based on the received histopathology images.

6. The apparatus of claim 5, wherein the histopathology images received from the one or more publicly available datasets comprise whole image level annotations indicating whether the two or more of the histopathology images are similar or dissimilar.

7. The apparatus of claim 1, wherein the classifying of the two or more of the histopathology images as similar or dissimilar comprises:
   generate, using a generative model, annotations of similar regions or dissimilar regions within the two or more histopathology images.

8. The apparatus of claim 7, wherein the annotations apply to substantially an entirety of the two or more histopathology images.

9. The apparatus of claim 7, wherein the annotations apply to one or more regions within each of the two or more histopathology images.

10. The apparatus of claim 1, wherein the executable instructions, when executed by the processor, further cause the processor to:
    train a feature extractor using the training image data using a deep similarity learning methodology.

11. The apparatus of claim 10, wherein the executable instructions, when executed by the processor, further cause the processor to:
    receive a query image,
    implement a search engine configured to search an image database based on the query image, and
    generate search results including one or more output histopathology images ranked based on similarity between the one or more output histopathology images and the query image.

12. The apparatus of claim 10, wherein the deep similarity learning methodology is configured to ignore dissimilar pairs of regions in the training image data that are labeled as similar and ignore similar pairs of regions in the training image data that are labeled as dissimilar.

13. The apparatus of claim 10, wherein the deep similarity learning methodology comprises an optimization function configured to ignore dissimilar pairs of regions that are labeled as similar in the training image and ignore similar pairs of regions that are labeled as dissimilar in the training image data.

14. A method for generating training image data, comprising:
    obtaining a plurality of histopathology images;
    classifying two or more of the histopathology images as similar or dissimilar;
    creating a dataset of training image data including the classified histopathology images; and
    using a generative adversarial network (GAN) including a discriminative network and a generative network, until the discriminative network is unable to detect whether a plurality of synthetic histopathology images are synthetic:
        generating the synthetic histopathology images using the generative network, wherein the synthetic histopathology images comprise at least one similar region,
        comparing the synthetic histopathology images to the histopathology images using the discriminative network,
        if the discriminative network is unable to distinguish the synthetic histopathology images from the histopathology images, outputting the synthetic histopathology images, and
        if the discriminative network is able to distinguish the synthetic histopathology images from the histopathology images, providing feedback to the generative network for a next iteration,
    wherein creating the dataset of training image data comprises including the synthetic histopathology images output from the GAN in the dataset of training image data.

15. The method of claim 14, further comprising:
    obtaining coarse annotations regarding the similarity or dissimilarity of the two or more histopathology images,
    wherein the classifying of the two or more of the histopathology images as similar or dissimilar is based on the received coarse annotations.

16. A non-transitory computer readable medium for generating training image data, the computer readable medium having program instructions for causing a hardware processor to:
    obtain a plurality of histopathology images;
    classify two or more of the histopathology images as similar or dissimilar; and
    create a dataset of training image data including the classified histopathology images;
    wherein the instructions are further configured to cause the hardware processor to:
        using a generative adversarial network (GAN) including a discriminative network and a generative network, until the discriminative network is unable to detect whether a plurality of synthetic histopathology images are synthetic:
            generate the synthetic histopathology images using the generative network, wherein the synthetic histopathology images comprise at least one similar region, compare the synthetic histopathology images to the histopathology images using the discriminative network,
            if the discriminative network is unable to distinguish the synthetic histopathology images from the histopathology images, output the synthetic histopathology images, and
            if the discriminative network is able to distinguish the synthetic histopathology images from the histopathology images, provide feedback to the generative network for a next iteration,
        wherein creating the dataset of training image data comprises including the synthetic histopathology images output from the GAN in the dataset of training image data.

17. The non-transitory computer readable medium of claim 16, wherein the instructions are further configured to cause the hardware processor to:
    obtain coarse annotations regarding the similarity or dissimilarity of the two or more histopathology images,
    wherein the classifying of the two or more of the histopathology images as similar or dissimilar is based on the received coarse annotations.

* * * * *